United States Patent
Karthik et al.

(10) Patent No.: US 12,412,424 B2
(45) Date of Patent: Sep. 9, 2025

(54) PREDICTING AVATARS FOR A USER BASED ON EMOTIONS OF THE USER

(71) Applicant: Bank of America Corporation, Charlotte, NC (US)

(72) Inventors: Gayathri Karthik, Tamil Nadu (IN); Kumaraguru Mohan, Tamil Nadu (IN); Vivek Jaiswal, Telangana (IN); Logesh M M, Tamil Nadu (IN); Vasantha Kumar Babu, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 348 days.

(21) Appl. No.: 18/296,600

(22) Filed: Apr. 6, 2023

(65) Prior Publication Data

US 2024/0338972 A1 Oct. 10, 2024

(51) Int. Cl.
*G06V 40/16* (2022.01)
*G06V 10/75* (2022.01)
*G06V 10/774* (2022.01)

(52) U.S. Cl.
CPC .......... *G06V 40/174* (2022.01); *G06V 10/751* (2022.01); *G06V 10/774* (2022.01); *G06V 40/168* (2022.01)

(58) Field of Classification Search
CPC .. G06V 40/174; G06V 40/168; G06V 10/751; G06V 10/774; G06V 40/171; G06V 40/176
See application file for complete search history.

(56) References Cited

U.S. PATENT DOCUMENTS

| | | |
|---|---|---|
| 8,063,929 B2 | 11/2011 | Kurtz et al. |
| 8,112,490 B2 | 2/2012 | Upton et al. |
| 8,149,241 B2 | 4/2012 | Do et al. |
| 8,154,578 B2 | 4/2012 | Kurtz et al. |
| 8,154,583 B2 | 4/2012 | Kurtz et al. |
| 8,159,519 B2 | 4/2012 | Kurtz et al. |
| 8,237,771 B2 | 8/2012 | Kurtz et al. |
| 8,253,770 B2 | 8/2012 | Kurtz et al. |
| 8,274,544 B2 | 9/2012 | Kurtz et al. |
| 9,808,722 B2 | 11/2017 | Kawachiya et al. |

(Continued)

OTHER PUBLICATIONS

Jia Zheng Lim et al., "Emotion Recognition Using Eye-Tracking: Taxonomy, Review and Current Challenges," MDPI, Sensors 2020, 20, 2384; doi:10.3390/s20082384, www.mdpi.com/journal/sensors.

*Primary Examiner* — Syed Haider (57) ABSTRACT

A system receives a first image and extracts a first set of facial features from the first image. The system determines that a user exhibited a first emotion in the first image. The system determines that the user selected a first avatar for use within a virtual environment. The system associates the first avatar with the first emotion of the user. The system receives a second image and extracts a second set of facial features from the second image. The system determines that the user exhibited a second emotion in the second image. The system determines that the first set of facial features corresponds to the second set of facial features. In response, the system presents the first avatar to the user. The system determines that the user selects the first avatar. The system implements the first avatar on behalf of the user for use in the virtual environment.

20 Claims, 4 Drawing Sheets

(56) References Cited

U.S. PATENT DOCUMENTS

| | | |
|---|---|---|
| 9,864,742 B2 | 1/2018 | Chen et al. |
| 10,326,667 B2 | 6/2019 | Jones et al. |
| 2009/0177969 A1 | 7/2009 | Jones et al. |
| 2017/0259167 A1 | 9/2017 | Cook et al. |
| 2018/0091732 A1* | 3/2018 | Wilson .................... G06F 3/048 |
| 2019/0250934 A1* | 8/2019 | Kim .................. H04M 1/72436 |
| 2019/0266775 A1* | 8/2019 | Lee ....................... G06F 3/0346 |
| 2020/0193667 A1* | 6/2020 | Chu ....................... G06T 11/60 |
| 2020/0234481 A1* | 7/2020 | Scapel .................. A63F 13/213 |
| 2021/0357447 A1 | 11/2021 | Mckenzie |
| 2022/0198254 A1 | 6/2022 | Dalli et al. |
| 2022/0240779 A1 | 8/2022 | Peyman |
| 2022/0248955 A1 | 8/2022 | Tran |
| 2022/0318852 A1 | 10/2022 | Blaikie, III et al. |
| 2023/0215070 A1* | 7/2023 | Jordan .................. G06T 13/205 |

* cited by examiner

PREDICTING AVATARS FOR A USER BASED ON EMOTIONS OF THE USER

TECHNICAL FIELD

The present disclosure relates generally to data processing, and more specifically to predicting avatars for a user based on emotions of the user.

BACKGROUND

Users of virtual environments may use avatars to operate within the virtual environment. Users are provided a wide variety of avatars to choose from when they want to access the virtual environment. Most if not all of the generated avatars are generic and may not be of interest to the users. A large number of processing and memory resources are spent to generate these avatars. Similarly, a large number of network resources are spent to communicate these avatars to user devices.

SUMMARY

The system described in the present disclosure is particularly integrated into practical applications of improving the processing, memory, and network allocation and utilization for generating avatars for users to operate within virtual environments, and communicating the generated avatars to the users for user selection. These practical applications and technical advantages that are derived from them are described below.

The disclosed system is configured to reduce processing, memory, and network resources that would be otherwise spent to generate and present avatars that are irrelevant to the user (and user's emotion) using the current virtual environment management technology. In the current virtual environment management technology, users are presented with a wide variety of avatars to choose from when they want to operate within the virtual environment. A large number of processing and memory resources are spent to generate and maintain these wide varieties of avatars in databases. Most of the generated avatars are irrelevant and not of interest to the users. Therefore, most of the generated avatars are never selected by the users. Thus, the spent processing and memory resources are wasted. Furthermore, network resources are used to communicate the generated avatars to the users on their user devices and/or on an application platform where the users can access the virtual environments-most of these generated avatars turn out to be irrelevant to the user and to the user's emotion at the time of the avatar selection. Thus, the spent network resources are wasted using the current virtual environment management technology.

Certain embodiments of the disclosed system are configured to provide a technical solution to the above-identified and other technical problems arising in the realm of virtual environment technology. The present disclosure is configured to contemplate unconventional systems and methods to predict the emotion of the user based on images of the user, determine which avatars the user had selected previously when they had the same or similar emotions, associate or link the selected avatars to the detected emotions of the user at the time of the avatar selection, provide a list of recommended avatars that are associated with the same or similar emotions to the user, and implement an avatar that the user selects among the list of recommended avatars on behalf of the user to operate within the virtual environment. Therefore, the system is configured to learn the association and link between a selected avatar and the emotion of the user at the time of selection of the avatar 104.

In certain embodiments, the disclosed system is configured to generate more relevant avatars that have one or more combined attributes of avatars for each emotion of the user and present the generated avatars along with the historically selected avatars per each case of detected emotion of the user. This improves the efficiency in the utilization of processing, memory, and network resources that are typically spent on generating and presenting irrelevant avatars using the current techniques.

In this manner, the disclosed system provides the practical application of conserving processing, memory, and network resources that would otherwise be spent on generating and presenting irrelevant avatars to the user using the current technology. For example, by classifying the emotions of the user with respective avatars that the user historically elected, the disclosed system is configured to generate and present more relevant avatars per each emotion of the user. Thus, the processing, memory, and network resources are allocated more efficiently to the operations of generating and presenting the more relevant avatars per each emotion of users.

In certain embodiments, a system for predicting avatars for a user based on the emotion of the user comprises a camera and a processor. The camera is configured to capture a set of images of a user, wherein the set of images comprises a first image and a second image. The processor is operably coupled to the camera. The processor is configured to receive the first image from the camera. The processor is further configured to extract a first set of facial features from the first image. The processor is further configured to determine that the user exhibited a first emotion in the first image based at least in part upon the first set of extracted facial features. The processor is further configured to determine that the user selects a first avatar for use within a virtual environment. The processor is further configured to associate the first emotion of the user to the first avatar. The processor is further configured to build a training dataset that comprises the first emotion of the user labeled with the first avatar. The processor is further configured to receive the second image from the camera. The processor is further configured to extract a second set of facial features from the second image. The processor is further configured to determine that the user exhibited a second emotion in the second image based at least in part upon the second set of extracted facial features. The processor is further configured to compare at least one of the first set of extracted facial features to a counterpart facial feature from among the second set of extracted facial features. The processor is further configured to determine that more than a threshold percentage of the first set of extracted facial features correspond to the counterpart facial features from among the second set of extracted facial features. in response to determining that more than the threshold percentage of the first set of extracted facial features correspond to the counterpart facial features from among the second set of extracted facial features, the processor is further configured to determine that the first emotion of the user corresponds to the second emotion of the user exhibited in the second image. The processor is further configured to present at least the first avatar that is labeled with the first emotion for user selection. The processor is further configured to implement the first avatar on behalf of the user in the virtual environment.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to predict avatars for a user based on the emotions of the user. Embodiments of the present disclosure and its advantages may be understood by referring to FIGS. 1 through 4. FIGS. 1 through 4 are used to describe systems and methods that predict avatars for a user based on the emotions of the user.

System Overview

Figure 1:
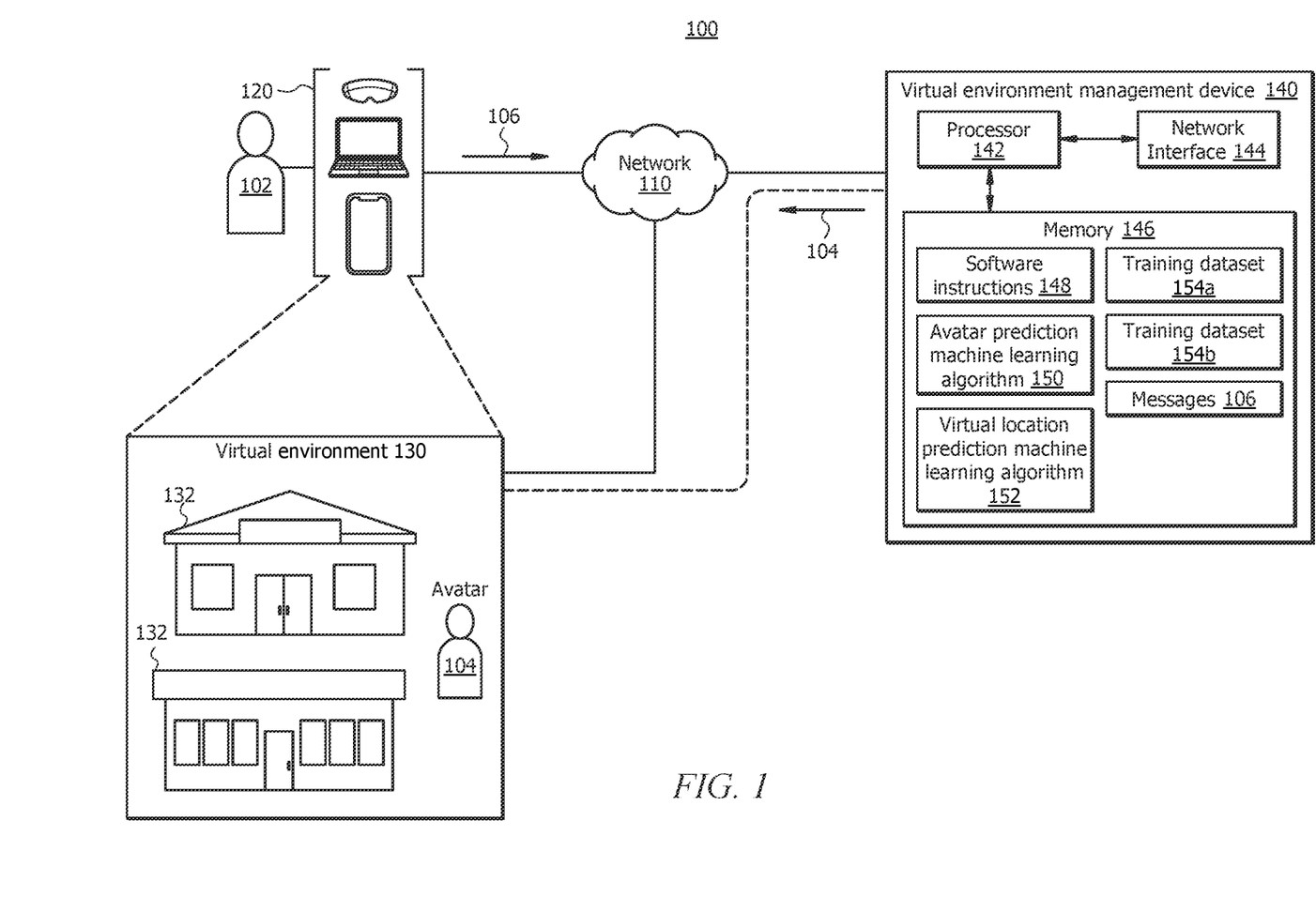
FIG. 1 illustrates an embodiment of a system configured to predict avatars for a user based on emotions of the user.

FIG. 1 illustrates an embodiment of a system 100 that is generally configured to i) predict avatars 104 for a user 102 based on the emotion 156 of the user 102 to operate within the virtual environment 130 and ii) predict virtual locations 132 for the user 102 based on the emotion 156 of the user 102 to visit within the virtual environment 130. In certain embodiments, the system 100 comprises a computing device 120 communicatively coupled to the virtual environment management device 140 via a network 110. Network 110 enables communications among the components of the system 100. The computing device 120 includes a processor (202 in FIG. 2) in signal communication with a memory (220 in FIG. 2). Memory (220 in FIG. 2) stores software instructions (222 in FIG. 2) that when executed by the processor (202 in FIG. 2) cause the processor to perform one or more operations described herein. The virtual environment management device 140 includes a processor 142 in signal communication with a memory 146. Memory 146 stores software instructions 148 that when executed by the processor 142 cause the processor 142 to perform one or more operations described herein. In other embodiments, system 100 may not have all of the components listed and/or may have other elements instead of, or in addition to, those listed above.

In general, the system 100 reduces processing, memory, and network resources that would be otherwise spent to generate and present avatars 104 that are irrelevant to the user 102 (and user's emotion 156) using the current virtual environment management technology. In the current virtual environment management technology, the users 102 are presented with a wide variety of avatars 104 to choose from when they want to operate within the virtual environment 130. A large number of processing and memory resources are spent to generate these wide varieties of avatars 104. Most of the generated avatars 104 may be irrelevant and not of interest to the users 102. Thus, the spent processing and memory resources are wasted. Furthermore, network resources are used to communicate the generated avatars 104 to the users 102 which may turn out to be irrelevant to the user 102 and to the user's emotion at the time of the avatar selection. Thus, the spent network resources are wasted using the current virtual environment management technology.

Certain embodiments of the system 100 are configured to provide a solution to this and other technical problems arising in the realm of virtual environment management technology. The present disclosure is configured to contemplate unconventional systems and methods to predict the emotion of the user 102 based on images of the user 102, determine which avatars 104 the user 102 had selected previously when they had the same or similar emotions, associate or link the selected avatars 104 to the detected emotions 156 of the user 102 at the time of the avatar selection, provide a list of recommended avatars 104 that are associated with the same or similar emotions to the user 102, and implement an avatar 104 that the user selects among the list of recommended avatars 104 on behalf of the user 102 to operate within the virtual environment 130. Therefore, the system 100 is configured to learn the association and link between a selected avatar 104 and the emotion of the user 102 at the time of selection of the avatar 104.

In certain embodiments, the system 100 is configured to generate more relevant avatars 104 that have combined attributes of avatars 104 for each emotion of the user 102 and present the generated avatars 104 along with the historically selected avatars 104 per each case of detected emotion of the user 102. This improves the efficiency in utilization of processing, memory, and network resources that are typically spent for generating and presenting irrelevant avatars 104 using the current technology.

In this manner, the system 100 provides the practical application of conserving processing, memory, and network resources that would otherwise be spent on generating and presenting irrelevant avatars 104 to the user 102 using the current technology. For example, by classifying emotions 156 of the user 102 with respective avatars 104 that the user 102 historically elected, the system 100 is configured to generate and present more relevant avatars 104 per each emotion 156 of the user 102. Thus, the processing, memory, and network resources are allocated more efficiently to operations of generating and presenting the more relevant avatars 104 per each emotion 156 of users 102.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

Figure 2:
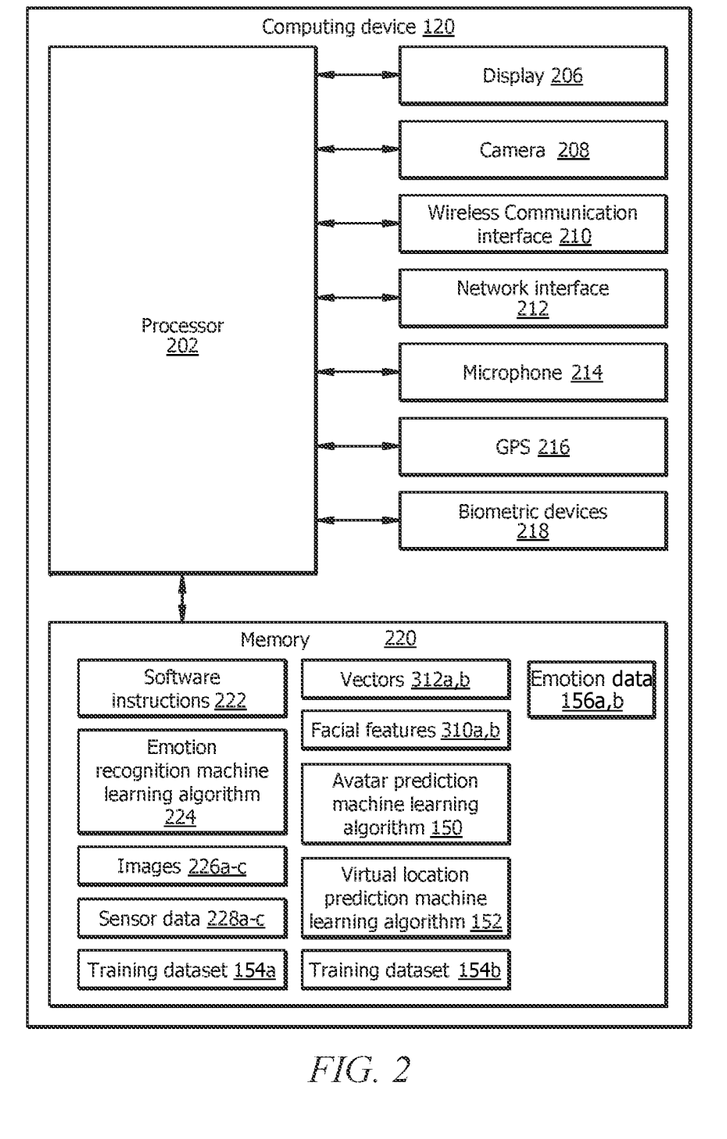
FIG. 2 illustrates a block diagram of an embodiment of a computing device used by the system 100 of FIG. 1.

Computing device 120 is described in detail in the discussion of FIG. 2. In brief, a computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, keypad, or other appropriate terminal equipment usable by user 102. The computing device 120 may include a hardware processor, memory, and/or circuitry (see FIG. 2) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. In the present disclosure, the computing device 120 may be interchangeably referred to as a user device.

FIG. 2 illustrates a block diagram of an embodiment of the computing device 120 used by the system 100 of FIG. 1. The computing device 120 may be configured to display the virtual environment 130 (see FIG. 1) within a field of view of the user (see FIG. 1), capture biometric, sensory, and/or physical information of the user wearing and/or operating the computing device 120, and to facilitate an electronic interaction between the user and other components of the system 100 (see FIG. 1), including the virtual environment management device 140.

In the illustrated embodiment, the computing device 120 comprises a processor 202, a memory 220, a display 206, a camera 208, a wireless communication interface 210, a network interface 212, a microphone 214, a global positioning system (GPS) sensor 216, and biometric devices 218. The components of the computing device 120 are operably coupled to each other via wires and/or wireless communications. The processor 202 comprises one or more processors operably coupled to and in signal communication with memory 220, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions, including software instructions that when executed by the processor 202 cause the computing device 120 to perform one or more operations of the computing device 120 described herein. For example, the one or more processors are configured to execute instructions to implement the function disclosed herein, such as some or all of those described with respect to FIGS. 1-4. For example, processor 202 may be configured to display the virtual environment (130 in FIG. 1), virtual objects and locations within the virtual environment (130 in FIG. 1) on display 206, detect avatar location in the virtual environment, detect user location in the real world, identify virtual sub-environment/locations within the virtual environment, capture biometric information of a user, via one or more of camera 208, microphone 214, and/or biometric devices 218, and communicate via wireless communication interface 210 with virtual environment management device 140 (see FIG. 1) and/or other user devices 120 (see FIG. 1).

Memory 220 may be volatile or non-volatile and may comprise read-only memory (ROM), random-access memory (RAM), ternary content-addressable memory (TCAM), dynamic random-access memory (DRAM), and static random-access memory (SRAM). The memory 220 may include one or more of a local database, a cloud database, a network-attached storage (NAS), etc. The memory 220 comprises one or more disks, tape drives, or solid-state drives, and may be used as an over-flow data storage device, to store programs when such programs are selected for execution, and to store instructions and data that are read during program execution. The memory 220 may store any of the information described in FIGS. 1-4 along with any other data, instructions, logic, rules, or code operable to implement the function(s) described herein when executed by processor 202. For example, the memory 220 may store software instructions 222, emotion recognition machine learning algorithm 224, images 226a-c, sensor data 228a-c, training dataset 154a, vectors 312a, b, facial features 310a, b, avatar prediction machine learning algorithm 150, virtual location prediction machine learning algorithm 152, training dataset 154b, emotion data 156a,b, and/or any other data or instructions. The software instructions 222 may comprise any suitable set of instructions, logic, rules, or code operable to execute the processor 202 and perform the functions described herein, such as some or all of those described in FIGS. 1-4. In some embodiments, the memory 220 may store and/or include a browser or web application for a computing device 120 to interact with the virtual locations in the virtual environment 130 and other devices.

The emotion recognition machine learning algorithm 224 may be implemented by the processor 202 executing software instructions 222 and is generally configured to detect emotions of the user based on images 226 (e.g., images 226a-c) and/or sensor data 228 (e.g., sensor data 228a-c). In certain embodiments, the emotion recognition machine learning algorithm 224 may include a support vector machine, neural network, random forest, k-means clustering, Tree-based algorithm, Random Forest algorithm, etc. In certain embodiments, the emotion recognition machine learning algorithm 224 may be implemented by a plurality of neural network layers, convolutional neural network layers, Long-Short-Term-Memory (LSTM) layers, Bi-directional LSTM layers, recurrent neural network layers, and the like. In certain embodiments, the emotion recognition machine learning algorithm 224 may include a neural network image processing algorithm.

The emotion recognition machine learning algorithm 224 may be configured to be implemented by unsupervised, semi-supervised, and/or supervised machine learning algorithm. For example, the emotion recognition machine learning algorithm 224 may be pre-trained to determine the emotion 156 of the user 102 from the image 226 based on a training dataset that comprises a set of image samples, each labeled with a respective emotion 156. The emotion recognition machine learning algorithm 224 may be given a training image labeled with a respective emotion 156. The emotion recognition machine learning algorithm 224 may extract a set of facial features from the training image. The emotion recognition machine learning algorithm 224 may learn to associate the extracted set of facial features to the emotion label. The emotion recognition machine learning algorithm 224 may perform this operation for multiple training images to build the training dataset.

In the testing phase, the emotion recognition machine learning algorithm 224 may be given a testing image and asked to predict the emotion of a user shown in the testing image. The emotion recognition machine learning algorithm 224 may extract a set of facial features from the testing image. The emotion recognition machine learning algorithm 224 may compare the extracted set of facial features to the facial features provided in the training dataset. The emotion recognition machine learning algorithm 224 may determine to which of the provided facial features in the training dataset, the newly extracted facial features correspond or match with. In response to finding a match, the emotion recognition machine learning algorithm 224 may determine that the newly extracted facial features are associated with the same emotion as the corresponding or matching facial features as provided in the training dataset. Similar operations may be performed with respect to the sensor data 228. For example, the emotion recognition machine learning algorithm 224 may be pre-trained to determine the emotion 156 of the user 102 from the sensor data 228 based on a training dataset that comprises a set of sensor data samples, each labeled with a respective emotion 156.

Display 206 may be or include a display screen that allows displaying objects (e.g., virtual and/or physical objects). Display 206 is configured to present visual information to a user (for example, user 102 in FIG. 1) in an augmented reality environment that overlays virtual or graphical objects onto tangible objects in a real scene in real-time. In certain embodiments, the display 206 is configured to present visual information to the user as the virtual environment 130 (see FIG. 1) in real-time. In certain embodiments, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In certain embodiments, display 206 is a graphical display on a computing device 120. For example, the graphical display may be the display of a tablet or smart phone configured to display an augmented reality environment with virtual or graphical objects overlaid onto tangible objects in a real scene in real-time environment and/or virtual environment 130.

Camera 208 may be or include one or more cameras that are configured to capture images 226 of a field of view in front of the computing device 120 and/or in front of the camera 208. Examples of the camera 208 may include charge-coupled device (CCD) cameras and complementary metal-oxide semiconductor (CMOS) cameras. For example, camera 208 may be configured to capture images 226 of a wearer or user of the computing device 120. Camera 208 may be configured to capture images continuously, at predetermined intervals, or on-demand. For example, camera 208 may be configured to receive a command from the user to capture an image 226. In another example, camera 208 is configured to continuously capture images to form a video stream. Camera 208 is communicably coupled to processor 202.

Wireless communication interface 210 may be or include any communication interface that allows communication with other devices. The wireless communication interface 210 is configured to facilitate processor 202 in communicating with other devices. Wireless communication interface 210 is configured to employ any suitable communication protocol, including WIFI, Bluetooth, among others.

Network interface 212 is configured to enable wired and/or wireless communications. The network interface 212 may be configured to communicate data between the computing device 120 and other devices, systems, or domains of the system 100 (see FIG. 1). For example, the network interface 212 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 202 may be configured to send and receive data using the network interface 212. The network interface 212 may be configured to use any suitable type of communication protocol.

Microphone 214 may be or include a sound-detecting sensor or sound-detecting sensor array. Microphone 214 is generally configured to capture audio signals (e.g., voice signals or commands) from a user. Microphone 214 is communicably coupled to processor 202. Microphone 214 may communicate the detected audio signals to the processor 202.

GPS sensor 216 may be configured to capture and provide geographical location information. For example, GPS sensor 216 is configured to provide a geographic location of a computing device 120. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202. GPS sensor 216 may communicate the captured location of the computing device 120 to the processor 202.

Examples of biometric devices 218 may include, but are not limited to, electrooculography sensors, retina scanners, fingerprint scanners, and the like. Biometric device 218 is communicably coupled to processor 202. Biometric devices 218 are configured to capture sensor data 228 that includes information about a person's physical characteristics and to output a biometric signal based on captured information. The biometric device 218 may communicate the captured biometric features as sensor data 228 to the processor 202.

Referring back to FIG. 1, the computing device 120 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment.

Virtual Environment Management Device

Virtual environment management device 140 generally includes a hardware computer system configured to manage activities within and with respect to the virtual environment 130. In certain embodiments, the virtual environment management device 140 may be implemented by a cluster of computing devices, such as virtual machines. For example, the virtual environment management device 140 may be implemented by a plurality of computing devices using distributed computing and/or cloud computing systems in a network. In certain embodiments, the virtual environment management device 140 may be configured to provide services and resources (e.g., data and/or hardware resources) to the components of the system 100. For example, the virtual environment management device 140 may be configured to predict avatars 104 based on emotions 156 of the users 102 and communicate the recommended avatars 104 to the user 102, e.g., via the computing device 120. In another example, the virtual environment management device 140 may be configured to predict virtual locations 132 based on emotions 156 of the users 102 and communicate the recommended virtual locations 132 to the user 102, e.g., via the computing device 120.

The virtual environment management device 140 comprises a processor 142 operably coupled with a network interface 144 and a memory 146. Processor 142 comprises one or more processors operably coupled to the memory 146. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the virtual environment management device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-4. For example, the processor 142 may be configured to perform one or more operations of the operational flow 300 described in FIG. 3 and one or more operations of the method 400 as described in FIG. 4.

Network interface 144 is configured to enable wired and/or wireless communications. The network interface 144 may be configured to communicate data between the virtual environment management device 140 and other devices, systems, or domains of the system 100. For example, the network interface 144 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-4 along with any other data, instructions, logic, rules, or code operable to implement the function(s) described herein when executed by processor 142. For example, the memory 146 may store software instructions 148, avatar prediction machine learning algorithm 150, training dataset 154a, messages 106, training dataset 154b, virtual location prediction machine learning algorithm 152, and/or any other data or instructions. The software instructions 148 may comprise any suitable set of instructions, logic, rules, or code operable to execute the processor 142 and perform the functions described herein, such as some or all of those described in FIGS. 1-4. The messages 106 may include any information stored in the memory (220 of FIG. 2) of the computing device 120. The computing device 120 may communicate the messages 106 to the virtual environment management device 140 at any appropriate time, e.g., before or when the user 102 wants to select an avatar 104 to operate within the virtual environment 130.

The avatar prediction machine learning algorithm 150 may be implemented by the processor 142 executing software instructions 148 and is generally configured to predict avatars 104 based on the emotion 156 of the user 102 (indicated in the message 106 received from the computing device 120). In certain embodiments, the avatar prediction machine learning algorithm 150 may include a support vector machine, neural network, random forest, k-means clustering. Tree-based algorithm, Random Forest algorithm, etc. In certain embodiments, the avatar prediction machine learning algorithm 150 may be implemented by a plurality of neural network layers, convolutional neural network layers, Long-Short-Term-Memory (LSTM) layers, Bi-directional LSTM layers, recurrent neural network layers, and the like. The avatar prediction machine learning algorithm 150 may be configured to be implemented by unsupervised, semi-supervised, and/or supervised machine learning algorithm. For example, the avatar prediction machine learning algorithm 150 may be configured to build the training dataset 154a that includes a set of user's emotions 156, each labeled with one or more respective avatars 104. The avatar prediction machine learning algorithm 150 may use the training dataset 154a to determine the recommended avatars 104 based on the detected emotion 156 of the user 102. This operation is described in greater detail in FIG. 3.

The virtual location prediction machine learning algorithm 152 may be implemented by the processor 142 executing software instructions 148 and is generally configured to predict virtual locations 132 based on the emotion 156 of the user 102 (indicated in the message 106 received from the computing device 120). In certain embodiments, the virtual location prediction machine learning algorithm 152 may include a support vector machine, neural network, random forest, k-means clustering. Tree-based algorithm, Random Forest algorithm, etc. In certain embodiments, the virtual location prediction machine learning algorithm 152 may be implemented by a plurality of neural network layers, convolutional neural network layers, Long-Short-Term-Memory (LSTM) layers, Bi-directional LSTM layers, recurrent neural network layers, and the like. The virtual location prediction machine learning algorithm 152 may be configured to be implemented by unsupervised, semi-supervised, and/or supervised machine learning algorithm. For example, the virtual location prediction machine learning algorithm 152 may be configured to build the training dataset 154b that includes a set of user's emotions 156, each labeled with one or more respective virtual locations 132. The virtual location prediction machine learning algorithm 152 may use the training dataset 154b to determine the recommended virtual locations 132 based on the detected emotion 156 of the user 102.

Operational Flow for Predicting Avatars Based on User's Emotions

Figure 3:
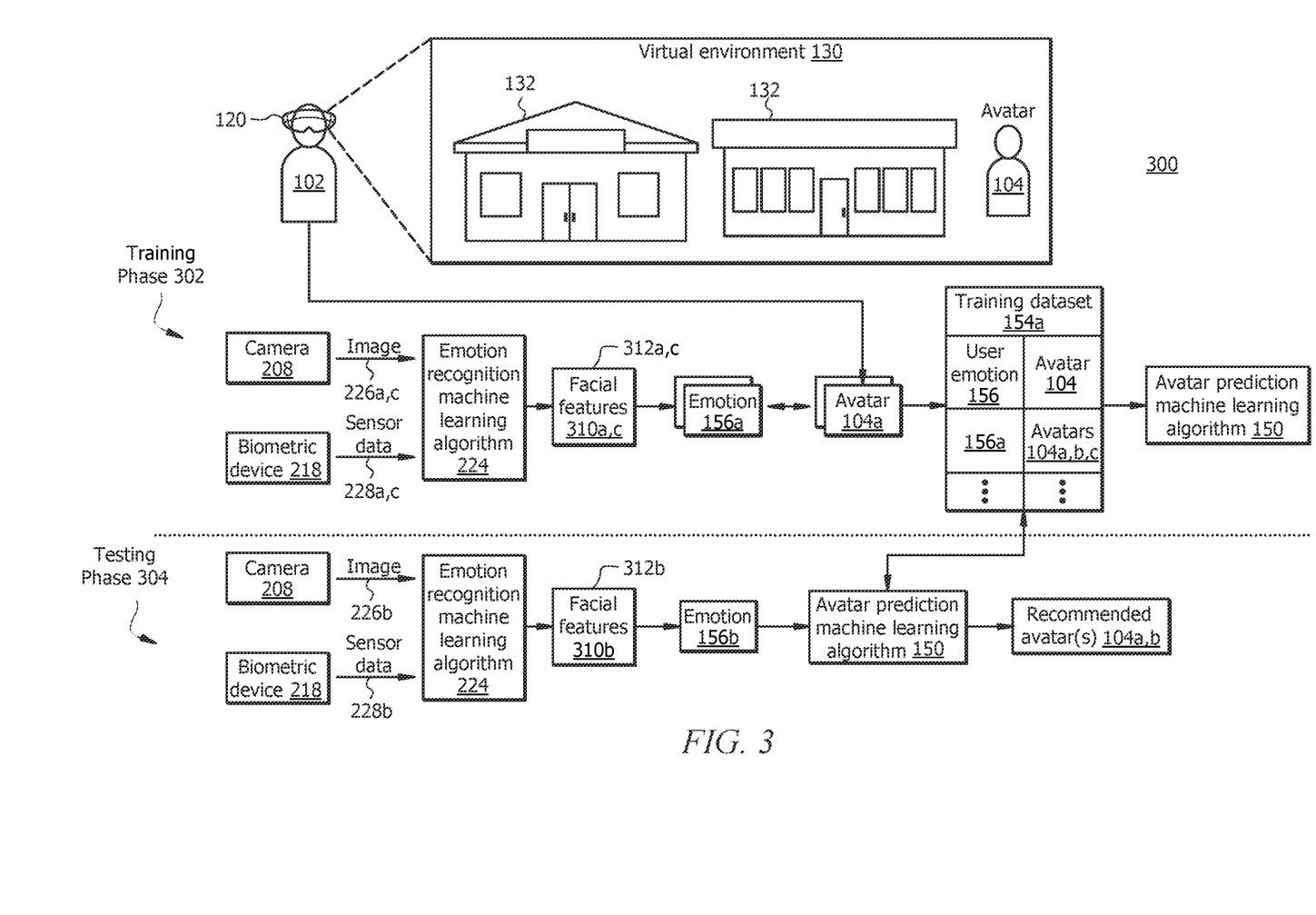
FIG. 3 illustrates an example operational flow of the system of FIG. 1 to predict avatars for a user based on emotions of the user.

FIG. 3 illustrates an example operational flow 300 of the system 100 (see FIG. 1) for predicting avatars 104 based on user's emotions 156. In an example scenario, assume that the user 102 wants to select an avatar 104 to operate within the virtual environment 130. The user 102 may log into their profile with respect to the virtual environment 130 using their credentials. In a case where the user device 120 is VR glasses, the user 102 may put on the user device 120.

In operation, the user device 120 and/or the virtual environment management device 140 may first build up the training dataset 154a that includes a set of user's emotions 156, each labeled with one or more respective customized avatars 104. This operation is described below.

Training Phase to Train the Avatar Prediction Machine Learning Algorithm

In the training phase 302, the user device 120 may receive a first image 226a of the user 102 from the camera 208. For example, in the case that the camera 208 is external to the user device 120, the camera 208 may communicate the image 226a to the user device 120. In another example, in the case that the camera 208 is internal to the user device 120, the camera 208 may communicate the image 226a to the processor of the user device 120. In response to the user 102 logging into their profile and access a platform to enter the virtual environment 130, the camera 208 associated with the user device 120 may capture the image 226a of the user 102. Receiving the first image 226a from the camera 208 may be in response to the user 102 being logged into their user profile with respect to the virtual environment 130 to access the virtual environment 130 at a first timestamp. Similarly, the user device 120 may receive sensor data 228a from the biometric device 218. For example, the sensor data 228a may include the average of the potential voltage signals between front and back of the eye of the user 102, eye movements, and eye tracking information, among other information during the time window that the user 102 puts on the user device 120.

The user device 120 may feed the image 226a and the sensor data 228a to the emotion recognition machine learning algorithm 224. The user device 120 (e.g., via the emotion recognition machine learning algorithm 224) may extract a first set of facial features 310a from the first image 226a and/or the sensor data 228a. The first set of facial features 310a may include eye tracking features, a posture of the face of the user 102, and shapes of different portions of the face of the user 102, among other information about physical attributes of the face of the user 102 shown in the image 226a and/or derived from the sensor data 228a.

The user device 120 (e.g., via the emotion recognition machine learning algorithm 224) may determine that the user 102 exhibited a first emotion 156a in the first image 226a based on the first set of facial features 310a. For example, the emotion recognition machine learning algorithm 224 may be pre-trained to determine the emotion 156a of the user 102 from the image 226a based on a training dataset that comprises a set of image samples, each labeled with a respective emotion 156 and/or a set of sensor data samples, each labeled with a respective emotion 156, similar to that described in FIG. 2.

The user device 120 may determine that the user 102 selects the avatar 104a for use within the virtual environment 130. For example, the user 102 may be presented with a list of avatars 104a on a display of the user device 120 and customize a particular avatar 104a per their current mood (e.g., emotion 156a). In customizing the avatar 104a, the user 102 may select different attributes of the avatar 104a, such as cloth, face, etc. In response, the user device 120 may determine that the emotion 156a of the user 102 may be associated to the avatar 104a. The user device 120 may then associate or link the emotion 156a of the user 102 to the avatar 104a. The user device 120 may perform these operations on multiple occasions during the training phase 302 to build up the training dataset 154a. Therefore, the training dataset 154a may gradually grow as new instances of user's emotions 156 and respective avatars 104 are detected and determined.

The user device 120 may then use the training dataset 154a to train the avatar prediction machine learning algorithm 150. For example, the training dataset 154a may be fed to the avatar prediction machine learning algorithm 150. The avatar prediction machine learning algorithm 150 may learn to associate each user emotion data 156 to the respective avatar(s) 104. For example, the avatar prediction machine learning algorithm 150 may extract a set of features from a user emotion data 156 (that indicates the emotion of the user 102, such as happy, sad, etc.). The extracted set of features may be represented by a vector. The avatar prediction machine learning algorithm 150 may then learn to associate the extracted set of features to the respective avatar(s) 104a.

In certain embodiments, the avatar prediction machine learning algorithm 150 may reside in the memory of the user device 120. Thus, in certain embodiments, the operations with respect to predicting the avatars 104 based on the user's emotion 156 and presenting the recommended avatar(s) 104 to the user 102 may be performed by the user device 120.

In certain embodiments, the avatar prediction machine learning algorithm 150 may reside in the memory of the virtual environment management device 140. Thus, in certain embodiments, the user device 120 may communicate the determined emotion 156a to the virtual environment management device 140 in messages (106 in FIG. 1) for processing. The virtual environment management device 140 may also determine that the user 102 selects the avatars 104a by monitoring the activities of the members of the virtual environment 130.

The virtual environment management device 140 (e.g., via the avatar prediction machine learning algorithm 150) may perform similar operations to that described above to build the training dataset 154*a* and to train the avatar prediction machine learning algorithm 150.

Testing Phase to Test the Avatar Prediction Machine Learning Algorithm

In the testing phase 304, assume that the user 102 wants to operate an avatar 104 within the virtual environment 130. In response, similar to that described above in the training phase 302, the user 102 may log into their profile and access the platform to enter the virtual environment 130. The camera 208 may capture a second image 226*b* of the user 102. The camera 208 may communicate the captured image 226*b* to the processor of the user device 120. The user device 120 may receive the second image 226*b* from the camera 208. Receiving the second image 226*b* from the camera 208 may be in response to the user 102 being logged into their user profile with respect to the virtual environment 130 to access the virtual environment 130 at a second timestamp. The second timestamp may be later than the first timestamp when the first image 226 was received or captured. Similarly, the user device 120 may receive the sensor data 228*b* from the biometric device 218. For example, the sensor data 228*b* may include the average of the potential voltage signals between the front and back of the eye of the user 102, eye movements, eye tracking information, among other information during the time window that the user 102 has put on the user device 120.

The user device 120 may feed the image 226*b* and the sensor data 228*b* to the emotion recognition machine learning algorithm 224. The user device 120 (e.g., via the emotion recognition machine learning algorithm 224) may extract a second set of facial features 310*b* from the second image 226*b* and/or the sensor data 228*b*. The second set of facial features 310*b* may include eye tracking features, the posture of the face of the user 102, and shapes of different portions of the face of the user 102, among other information about physical attributes of the face of the user 102 shown in the image 226*b* and/or derived from the sensor data 228*b*.

The user device 120 (e.g., via the emotion recognition machine learning algorithm 224) may determine that the user 102 exhibited a second emotion 156*b* in the second image 226*b* based on the second set of facial features 310*b*. For example, the emotion recognition machine learning algorithm 224 may be pre-trained to determine the emotion 156*b* of the user 102 from the image 226*b* based on a training dataset that comprises a set of image samples, each labeled with a respective emotion 156 and/or a set of sensor data samples, each labeled with a respective emotion 156, similar to that described in FIG. 2.

In response to detecting the emotion 156*b* of the user 102, the user device 120 may feed the emotion data 156*b* to the avatar prediction machine learning algorithm 150. The user device 120 (e.g., via the avatar prediction machine learning algorithm 150) may predict one or more avatars 104 based on the historical avatar selections of the user 102 when they had the same emotion as the current emotion 156*b*. In this process, the user device 120 (e.g., via the avatar prediction machine learning algorithm 150) may compare the first set of facial features 310*a* to each entry of the training dataset 154*a*. For example, the user device 120 (e.g., via the avatar prediction machine learning algorithm 150) may compare the first set of facial features 310*a* to the second set of facial features 310*b*. The user device 120 (e.g., via the avatar prediction machine learning algorithm 150) may determine whether more than a threshold percentage (e.g., 90%, 95%, etc.) of the first set of facial features 310*a* correspond to the counterpart facial features from among the second set of facial features 310*b*. In response to determining that more than the threshold percentage of the first set of facial features 310*a* correspond to the counterpart facial features from among the second set of facial features 310*b*, the user device 120 (e.g., via the avatar prediction machine learning algorithm 150) may determine that the first emotion 156*a* of the user 102 (shown in the first image 226*a*) corresponds to the second emotion 156*b* of the user 102 (shown in the second image 226*b*).

In certain embodiments, the user device 120 (e.g., via the avatar prediction machine learning algorithm 150) may determine that the second emotion 156*b* is the same or similar to the first emotion 156*a*. For example, second emotion 156*b* may be classified as a related emotion, and the first emotion 156*a* may be classified as a related, serene, calm, or contented emotion. The first set of facial features 310*a* may be represented by a first facial feature vector 312*a* that comprises a first set of numerical values. The second set of facial features 310*b* may be represented by a second facial feature vector 312*b* that comprise a second set of numerical values. Thus, in certain embodiments, comparing the first set of facial features 310*a* to the counterpart facial features from among the second set of facial features 310*b* may be in response to comparing the first facial feature vector 312*a* to the second facial feature vector 312*b*.

In certain embodiments, determining that the user 102 exhibits the first emotion 156*a* in the second image 226*b* may be in response to determining that more than a threshold percentage (e.g., 90%, 95%, etc.) of the first set of numerical values of the first facial feature vector 312*a* corresponds to the counterpart numerical values of the second facial feature vector 312*b*. In response, the user device 120 may present one or more recommended avatars 104*a* that each is labeled with the first emotion 156*a* for user selection, for example, on the application platform where the user 102 can access and view to select one of the avatars 104*a*. In this manner, the user device 120 (e.g., via the avatar prediction machine learning algorithm 150) may look into the training dataset 154*a* and predict the recommended avatars 104*a* for the user 102 based on their emotion 156*b*. The user 102 may select one of the recommended avatars 104*a*. The user device 120 may implement the selected avatar 104*a* on behalf of the user 102 so that user 102 is able to operate the selected avatar 104*a* in the virtual environment 130.

In certain embodiments, the avatar prediction machine learning algorithm 150 may reside in the memory of the virtual environment management device 140. Thus, in certain embodiments, the user device 120 may communicate the determined emotion 156*b* to the virtual environment management device 140 in messages (106 in FIG. 1) for processing. In certain embodiments, the operations with respect to the avatar prediction machine learning algorithm 150 may be performed by the virtual environment management device 140. For example, in response to receiving the determined emotion data 156*b*, the virtual environment management device 140 (e.g., via the avatar prediction machine learning algorithm 150) may predict the recommended avatar(s) 104*a* based on the training dataset 154*a*, similar to that described above. The avatar prediction machine learning algorithm 150 (e.g., via the avatar prediction machine learning algorithm 150) may then present the recommended avatar(s) 104*a* to the user 102.

Continuing the testing phase 304, in response to determining that more than the threshold percentage of the first set of extracted facial features 310*a* corresponds to the counterpart facial feature from among the second set of extracted facial features 310b, the user device 120 may present the first avatar 104a and second avatar 104b that are labeled with the first emotion 156a to the user for user selection. The user 102 may select one of the presented avatars 104a, b. The user device 120 may determine whether the user 102 selects one of the first and second avatars 104a,b. In response to determining that the user 102 selects one of the first and second avatars 104a, b, the user device 120 may implement the selected avatar 104a,b, on behalf of the user 102 so that user 102 can navigate through the virtual environment 103 using the selected avatar 104a, b.

In some cases, the user 102 may select another avatar 104, e.g., manually. If is it determined that the user 102 selects another avatar 104 (e.g., a third avatar 104c) that is different from the first and second avatars 104a, b, the user device 120 may associate the third avatar 104c to the first emotion 156a and update the training dataset 154a to include the third avatar 104c labeled with the first emotion 156a. In this manner, the training dataset 154a may grow and be updated based on new selections of the user 102. The updated training dataset 154a may be used for further avatar prediction operations.

As described above, in certain embodiments, the user device 120 may build up the training dataset 154a on multiple occasions when the user 102 wants to operate an avatar in the virtual environment 130. For example, the user device 120 may receive a third image 226c from the camera 208 when the user 102 logs into their profile at the virtual environment 130. The user device 120 may also receive sensor data 228c from the biometric device 218. The sensor data 228c may include the average of the potential voltage signals between the front and back of the eye of the user 102, eye movements, eye tracking information, among other information during the time window that the user 102 puts on the user device 120.

The user device 120 may extract a third set of facial features 310c from the third image 226c and/or the sensor data 228c, similar to that described above via the emotion prediction machine learning algorithm 224. In response, the user device 120 may determine the emotion of the user 102 as shown in the image 226c and/or derived from the sensor data 228c. The user device 120 may compare the determined emotion to each of the emotions 156 previously classified in the training dataset 154a. For example, assume that it is determined that the user 102 exhibits the first emotion 156a in the third image 226c based on the third set of facial features 310c and comparing with the training dataset 42a. The user device 120 may determine that the user 102 selects a second avatar 104b for use in the virtual environment 130. In response, the user device 120 may associate the first emotion 156a to the second avatar 104b. The user device 120 may add the second avatar 104b that is labeled with the first emotion 156a to the training dataset 154a.

In certain embodiments, the operations with respect to updating the training dataset 154 may be performed by one or both of the user device 120 and the virtual environment management device 140. For example, the user device 120 may communicate the determined emotion 156a of the user shown in the image 226c and/or derived from the sensor data 228c and the selected avatar 104b to the virtual environment management device 140. The virtual environment management device 140 may associate the selected avatar 104b to the detected emotion 156a and add the second avatar 104b that is labeled with the first emotion 156a to the training dataset 154a.

Although certain operations are described to be performed by the user device 120, in certain embodiments, any of the operations of the user device 120 may be performed by the virtual environment management device 140, such as determining the emotion of the user, determining that an avatar is selected, associating the determined emotion 156a to a selected avatar 104a, building the training dataset 154a, predicting the recommended avatars 104a, presenting the recommended avatars 104a to the user 102, among others. Similarly, although certain operations are described to be performed by the virtual environment management device 140, in certain embodiments, any of the operations of the virtual environment management device 140 may be performed by the user device 120, such as determining the emotion of the user, determining that an avatar is selected, associating the determined emotion 156a to a selected avatar 104a, building the training dataset 154a, predicting the recommended avatars 104a, presenting the recommended avatars 104a to the user 102, among others.

The system 100 of FIG. 1 may be configured to perform similar operations to predict one or more virtual locations 132 for the user 102 to visit based on the determined emotion 156 of the user 102 from the images 226a-c and/or sensor data 228a-c, by implementing the virtual location prediction machine learning algorithm 152 and the training dataset 154b, similar to that described above with respect to predicting one or more avatars 104a based on the emotion 156 of the user 102. In response, the user device 120 and/or the virtual environment management device 140 may provide one or more recommended virtual locations 132 to the user 102 by communicating the recommended virtual locations 132 in a message to the interface application platform that the user 102 uses to access the virtual environment 130. The recommended virtual locations 132 may be the same or similar to the virtual locations 132 that the user 102 previously visited when they had the same or similar emotion 156 as the currently determined emotion 156 for the user 102.

Method for Predicting Avatars Based on User's Emotions

Figure 4:
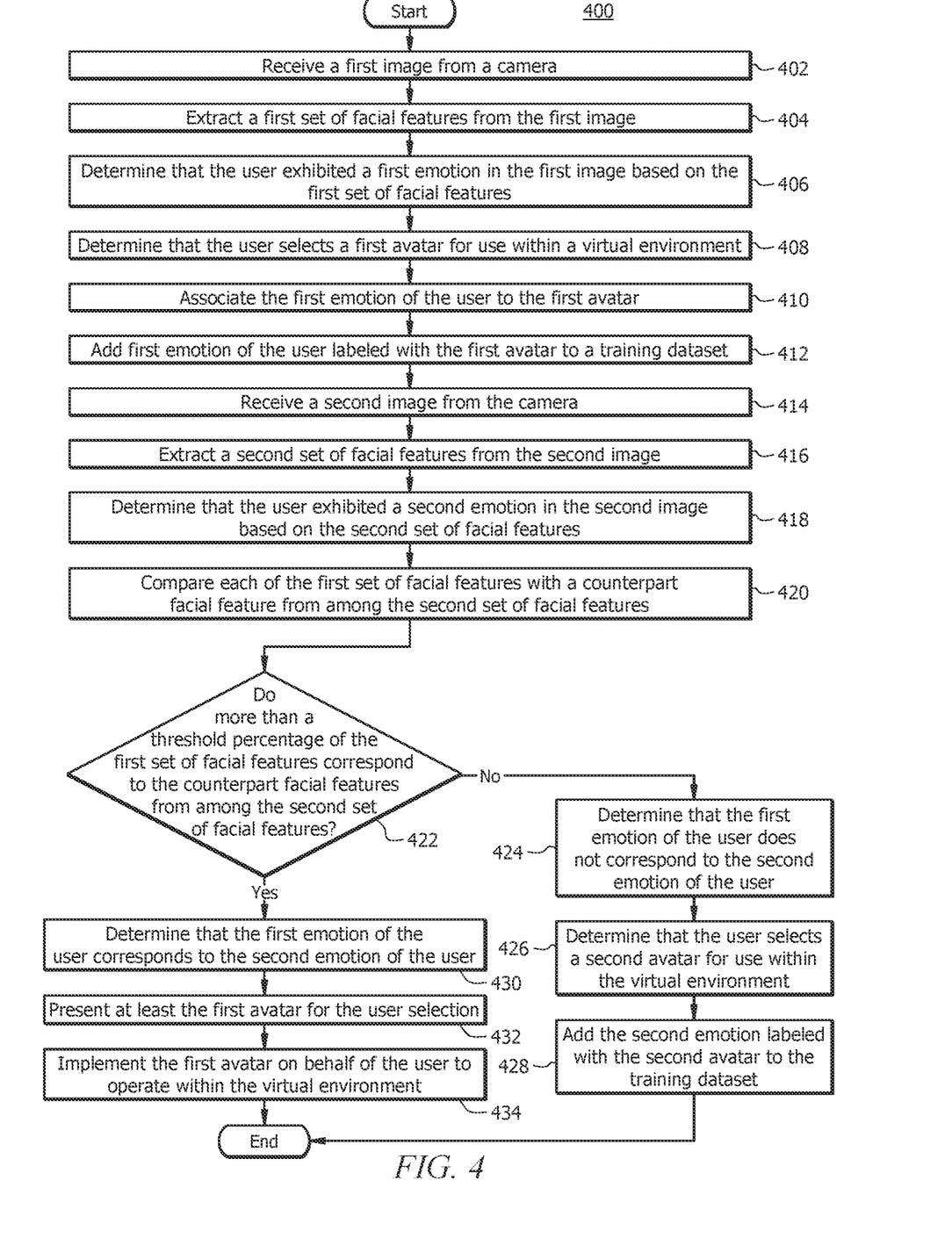
FIG. 4 illustrates an example flowchart of a method to predict avatars for a user based on emotions of the user.

FIG. 4 illustrates an example flowchart of a method 400 for predicting avatars 104 based on user's emotions 156. Modifications, additions, or omissions may be made to method 400. Method 400 may include more, fewer, or other operations. For example, operations may be performed in parallel or in any suitable order. While at times discussed as the system 100, user device 120, virtual environment management device 140, or components of any of thereof performing operations, any suitable system or components of the system may perform one or more operations of the method 400. For example, one or more operations of method 400 may be implemented, at least in part, in the form of software instructions 148, 222 of FIGS. 1 and 2, respectively, stored on non-transitory, tangible, machine-readable media (e.g., memory 146, 220 of FIGS. 1 and 2, respectively) that when run by one or more processors (e.g., processor 142, 202 of FIGS. 1 and 2, respectively) may cause the one or more processors to perform operations 402-434.

At operation 402, the user device 120 receives the first image 226a from the camera 208. For example, the camera 208 may capture the first image 226a of the user 102 when the user 102 logs into their profile at the virtual environment 130 using their credentials, e.g., in response to the user request or automatically.

At operation 404, the user device 120 extracts a first set of facial features 310a from the first image 226a. For example, the user device 120 may implement the emotion recognition machine learning algorithm 224 to extract the first set of facial features 310a from the first image 226a, similar to that described in FIGS. 2 and 3.

At operation 406, the user device 120 determines that the user 102 exhibited a first emotion 156a in the first image 226a based at least on the first set of facial features 310a. In certain embodiments, the user device 120 may also determine the first emotion 156a based on the sensor data 228a, similar to that described in FIG. 3.

At operation 408, the user device 120 may determine that the user 102 selects a first avatar 104a for use within the virtual environment 130. At operation 410, the user device 120 may associate the first emotion 156a of the user 102 with the first avatar 104a.

At operation 412, the user device 120 may add the first emotion 156a of the user 102 labeled with the first avatar 104a to the training dataset 154a. The user device 120 may perform the operations 402-412 on multiple times during the training phase 302 to grow the training dataset 154a, similar to that described in FIG. 3. In certain embodiments, the operations of building and growing the training dataset 154a (e.g., operations 402-412) may be performed by the virtual environment management device 140.

At operation 414, the user device 120 receives a second image 226b from the camera 208. For example, on another occasion that the user 102 wants to access the virtual environment 130, the user 102 may log into their profile at the virtual environment 130 using their credentials, similar to that described in FIG. 3.

At operation 416, the user device 120 may extract a second set of facial features 310b from the second image 226b, e.g., by implementing the emotion recognition machine learning algorithm 224, similar to that described in FIGS. 2 and 3. At operation 418, the user device 120 determines that the user 102 exhibits a second emotion 156b in the second image 226b based at least on the second set of facial features 310b. In certain embodiments, the user device 120 may also determine the second emotion 156b based on the sensor data 228b, similar to that described in FIG. 2.

At operation 420, the user device 120 may compare each of the first set of facial features 310a with a counterpart facial feature from among the second set of facial features 310b. In this operation, the first feature vector 312a may be compared to the second feature vector 312b. For example, the Euclidean distance between the first and second feature vectors 312a and 312b may be determined. In certain embodiments, the user device 120 may perform the operation 420, e.g., by implementing the avatar prediction machine learning algorithm 150.

At operation 422, the user device 120 may determine whether more than a threshold percentage of the first set of facial features 310a corresponds to the counterpart facial features from among the second set of facial features 310b. In this process, the user device 120 may determine whether the Euclidean distance between the first and second feature vectors 312a and 312b is less than a threshold distance (e.g., 0.1, 0.2, etc.). If it is determined that the Euclidean distance between the first and second feature vectors 312a and 312b is less than the threshold distance, it may be determined that the more than the threshold percentage of the first set of facial features 312a corresponds to the counterpart facial features from among the second set of facial features 310b. Otherwise, it may be determined that the less than the threshold percentage of the first set of facial features 312a corresponds to the counterpart facial features from among the second set of facial features 310b. If it is determined that the more than the threshold percentage of the first set of facial features 312a corresponds to the counterpart facial features from among the second set of facial features 310b, method 400 may proceed to operation 430. Otherwise, method 400 may proceed to operation 424.

At operation 424, the user device 120 may determine that the first emotion 156a of the user 102 does not correspond to the second emotion 156b of the user 102. At operation 426, the user device 120 may determine that the user 102 selects a second avatar 104b for use within the virtual environment 130. At operation 428, the user device 120 adds the second emotion 156b labeled with the second avatar 104b to the training dataset 154a.

At operation 430, the user device 120 may determine that the first emotion 156a of the user 102 corresponds to the second emotion 156b of the user 102. At operation 432, the user device 120 may present at least the first avatar 104a for the user selection. At operation 432, the user device 120 may implement the first avatar 104a on behalf of the user 102 to operate within the virtual environment 130.

In certain embodiments, the virtual environment management device 140 may perform at least one of the operations 402-432, e.g., by implementing the avatar prediction machine learning algorithm 150 and other software instructions. For example, any combination of the emotion data 156a, b, sensor data 228a, b, c, images 226a, b, c may be provided to the virtual environment management device 140 and the virtual environment management device 140 may predict the one or more avatars 104 for the user 102 based on the emotion 156 of the user and analyzing historical activities and selections of the user 102 and the training dataset 154a. Therefore, in certain embodiments, the virtual environment management device 140 may present a list of recommended avatars 104 to the user 102 for user selection and implement the selected avatar 104 on behalf of the user 102 to operate within the virtual environment 130.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for predicting avatars for a user based on an emotion of the user, the system comprising:
a camera configured to capture a set of images of a user, wherein the set of images comprises a first image and a second image;
a processor operably coupled to the camera, and configured to:
receive the first image from the camera;
extract a first set of facial features from the first image;
determine that the user exhibited a first emotion in the first image based at least in part upon the first set of extracted facial features;
determine that the user selects a first avatar for use within a virtual environment;
associate the first emotion of the user to the first avatar;
build a training dataset that comprises the first emotion of the user labeled with the first avatar;
receive the second image from the camera;
extract a second set of facial features from the second image;
determine that the user exhibited a second emotion in the second image based at least in part upon the second set of extracted facial features;
compare at least one of the first set of extracted facial features to a counterpart facial feature from among the second set of extracted facial features;
determine that more than a threshold percentage of the first set of extracted facial features correspond to the counterpart facial features from among the second set of extracted facial features;
in response to determining that more than the threshold percentage of the first set of extracted facial features correspond to the counterpart facial features from among the second set of extracted facial features:
determine that the first emotion of the user corresponds to the second emotion of the user exhibited in the second image;
present at least the first avatar that is labeled with the first emotion for user selection; and
implement the first avatar on behalf of the user in the virtual environment.

2. The system of claim 1, wherein:
receiving the first image from the camera is in response to the user being logged into a user profile to access the virtual environment at a first timestamp; and
receiving the second image from the camera is in response to the user being logged into the user profile to access the virtual environment at a second timestamp.

3. The system of claim 1, wherein:
the first set of facial features is represented by a first facial feature vector that comprises a first set of numerical values;
the second set of facial features is represented by a second facial feature vector that comprises a second set of numerical values; and
comparing at least one of the first set of extracted facial features to the counterpart facial features from among the second set of extracted facial features is in response to comparing the first facial feature vector to the second facial feature vector.

4. The system of claim 3, wherein determining that the user exhibits the first emotion in the second image is in response to determining that more than the threshold percentage of the first set of numerical values of the first facial feature vector corresponds to counterpart numerical values of the second facial feature vector.

5. The system of claim 1, wherein the processor is further configured to:
receive a third image from the camera;
extract a third set of facial features from the third image;
determine that the user exhibited the first emotion in the third image based at least in part upon the third set of extracted facial features;
determine that the user selects a second avatar for use within the virtual environment;
associate the first emotion of the user to the second avatar; and
add the second avatar labeled with the first emotion of the user to the training dataset.

6. The system of claim 5, wherein the processor is further configured to:
in response to determining that more than the threshold percentage of the first set of extracted facial features correspond to the counterpart facial feature from among the second set of extracted facial features:
present the first avatar and the second avatar that are labeled with the first emotion for user selection;
determine whether the user selected one of the first avatar and the second avatar; and
in response to determining that the user selects one of the first avatar and the second avatar, implement the selected avatar on behalf of the user in the virtual environment.

7. The system of claim 6, wherein the processor is further configured to:
in response to determining that the user selects a third avatar that is different from the first avatar and the second avatar:
associate the third avatar to the first emotion; and
update the training dataset to include the third avatar labeled with the first emotion.

8. A method for predicting avatars for a user based on an emotion of the user, the method comprising:
capturing a set of images of a user, wherein the set of images comprises a first image and a second image;
receiving the first image from a camera;
extracting a first set of facial features from the first image;
determining that the user exhibited a first emotion in the first image based at least in part upon the first set of extracted facial features;
determining that the user selects a first avatar for use within a virtual environment;
associating the first emotion of the user to the first avatar;
building a training dataset that comprises the first emotion of the user labeled with the first avatar;
receiving the second image from the camera;
extracting a second set of facial features from the second image;
determining that the user exhibited a second emotion in the second image based at least in part upon the second set of extracted facial features;
comparing at least one of the first set of extracted facial features to a counterpart facial feature from among the second set of extracted facial features;
determining that more than a threshold percentage of the first set of extracted facial features correspond to the counterpart facial feature from among the second set of extracted facial features;
in response to determining that more than the threshold percentage of the first set of extracted facial features correspond to the counterpart facial feature from among the second set of extracted facial features:

determining that the first emotion of the user corresponds to the second emotion of the user exhibited in the second image;

presenting at least the first avatar that is labeled with the first emotion for user selection; and implementing the first avatar on behalf of the user in the virtual environment.

9. The method of claim 8, wherein:

receiving the first image from the camera is in response to the user being logged into a user profile to access the virtual environment at a first timestamp; and receiving the second image from the camera is in response to the user being logged into the user profile to access the virtual environment at a second timestamp.

10. The method of claim 8, wherein:

the first set of facial features is represented by a first facial feature vector that comprises a first set of numerical values;

the second set of facial features is represented by a second facial feature vector that comprises a second set of numerical values; and comparing at least one of the first set of extracted facial features to the counterpart facial features from among the second set of extracted facial features is in response to comparing the first facial feature vector to the second facial feature vector.

11. The method of claim 10, wherein determining that the user exhibits the first emotion in the second image is in response to determining that more than the threshold percentage of the first set of numerical values of the first facial feature vector corresponds to counterpart numerical values of the second facial feature vector.

12. The method of claim 8, further comprising:

receiving a third image from the camera;

extracting a third set of facial features from the third image;

determining that the user exhibited the first emotion in the third image based at least in part upon the third set of extracted facial features;

determining that the user selects a second avatar for use within the virtual environment;

associating the first emotion of the user to the second avatar; and adding the second avatar labeled with the first emotion of the user to the training dataset.

13. The method of claim 12, further comprising:

in response to determining that more than the threshold percentage of the first set of extracted facial features correspond to the counterpart facial features from among the second set of extracted facial features:

present the first avatar and the second avatar that are labeled with the first emotion for user selection;

determine whether the user selected one of the first avatar and the second avatar; and in response to determining that the user selects one of the first avatar and the second avatar, implement the selected avatar on behalf of the user in the virtual environment.

14. The method of claim 13, further comprising:

in response to determining that the user selects a third avatar that is different from the first avatar and the second avatar:

associating the third avatar to the first emotion; and updating the training dataset to include the third avatar labeled with the first emotion.

15. A non-transitory computer-readable medium storing instructions that when executed by a processor, cause the processor to:

receive a first image of a user from a camera;

extract a first set of facial features from the first image;

determine that the user exhibited a first emotion in the first image based at least in part upon the first set of extracted facial features;

determine that the user selects a first avatar for use within a virtual environment;

associate the first emotion of the user to the first avatar;

build a training dataset that comprises the first emotion of the user labeled with the first avatar;

receive a second image of the user from the camera;

extract a second set of facial features from the second image;

determine that the user exhibited a second emotion in the second image based at least in part upon the second set of extracted facial features;

compare at least one of the first set of extracted facial features to a counterpart facial features from among the second set of extracted facial features;

determine that more than a threshold percentage of the first set of extracted facial features correspond to the counterpart facial features from among the second set of extracted facial features;

in response to determining that more than the threshold percentage of the first set of extracted facial features correspond to the counterpart facial features from among the second set of extracted facial features:

determine that the first emotion of the user corresponds to the second emotion of the user exhibited in the second image;

present at least the first avatar that is labeled with the first emotion for user selection; and implement the first avatar on behalf of the user in the virtual environment.

16. The non-transitory computer-readable medium of claim 15, wherein:

receiving the first image from the camera is in response to the user being logged into a user profile to access the virtual environment at a first timestamp; and receiving the second image from the camera is in response to the user being logged into the user profile to access the virtual environment at a second timestamp.

17. The non-transitory computer-readable medium of claim 15, wherein:

the first set of facial features is represented by a first facial feature vector that comprises a first set of numerical values;

the second set of facial features is represented by a second facial feature vector that comprises a second set of numerical values; and comparing at least one of the first set of extracted facial features to the counterpart facial features from among the second set of extracted facial features is in response to comparing the first facial feature vector to the second facial feature vector.

18. The non-transitory computer-readable medium of claim 17, wherein determining that the user exhibits the first emotion in the second image is in response to determining that more than the threshold percentage of the first set of numerical values of the first facial feature vector corresponds to counterpart numerical values of the second facial feature vector.

19. The non-transitory computer-readable medium of claim 15, wherein the processor is further configured to:

receive a third image from the camera;
extract a third set of facial features from the third image;
determine that the user exhibited the first emotion in the third image based at least in part upon the third set of extracted facial features;
determine that the user selects a second avatar for use within the virtual environment;
associate the first emotion of the user to the second avatar; and
add the second avatar labeled with the first emotion of the user to the training dataset.

20. The non-transitory computer-readable medium of claim 19, wherein the instructions further cause the processor to:
in response to determining that more than the threshold percentage of the first set of extracted facial features correspond to the counterpart facial feature from among the second set of extracted facial features:
present the first avatar and the second avatar that are labeled with the first emotion for user selection;
determine whether the user selected one of the first avatar and the second avatar; and
in response to determining that the user selects one of the first avatar and the second avatar, implement the selected avatar on behalf of the user in the virtual environment.

* * * * *